Patented Sept. 12, 1944

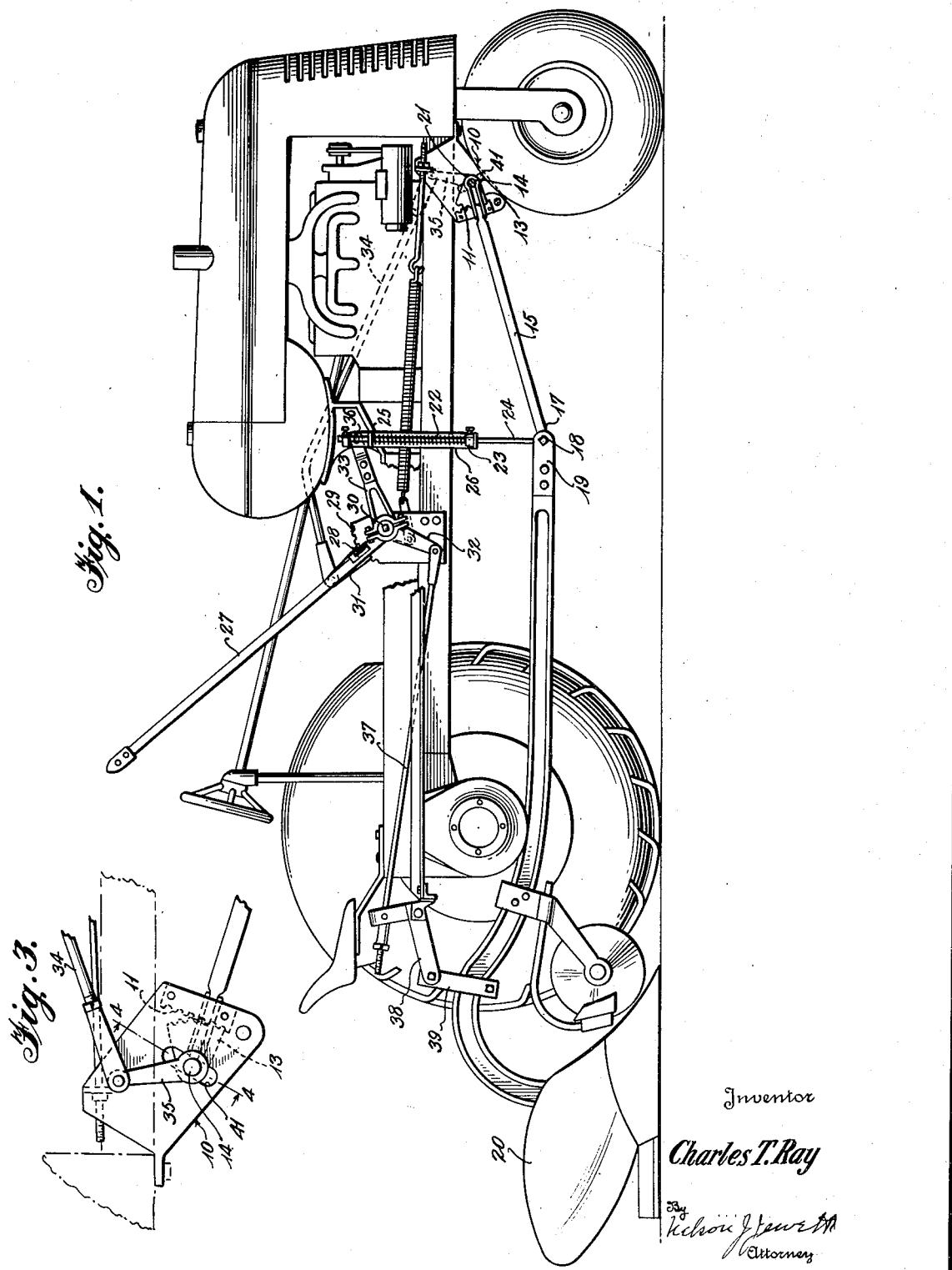

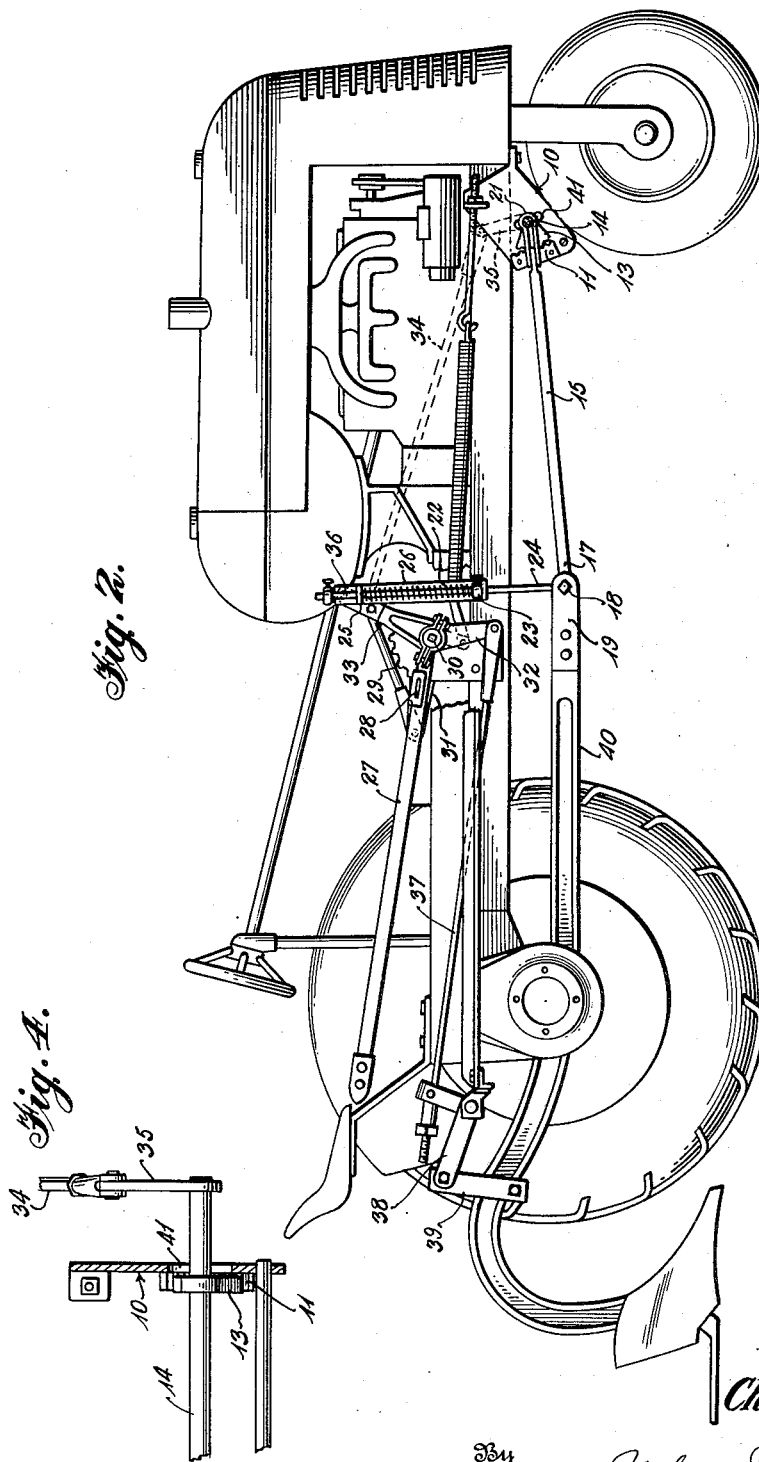

2,358,282

UNITED STATES PATENT OFFICE 2,358,282

DRAFT GEAR

Charles T. Ray, Louisville, Ky.

Application October 20, 1941, Serial No. 415,810

7 Claims. (Cl. 97—47)

The invention relates to draft gears and has as an object the provision of a draft gear particularly adapted to the coupling of a plow, lister, middleburster, or the like, to a tractor.

It is an object of the invention to improve upon the device shown in my copending application Serial No. 374,394, filed January 14, 1941.

It is a further object of the invention to provide a draft gear providing means to vertically adjust the point of attachment of the draft link to the frame of the tractor.

It is a further object of the invention to provide a draft gear having in combination means to move three points of elevation controlling connections of the implement to the tractor simultaneously.

Further objects of the invention will appear from the following description when read in connection with the accompanying drawings showing an illustrative embodiment of the invention, and wherein:

Figure 1 is a side elevation with one wheel omitted showing the draft gear applied to a tractor with a plow in working position;

Figure 2 is a like view with an implement raised;

Figure 3 is a detail side elevation of the front connection of a form of draft gear according to the invention, viewed in the opposite direction from Figure 1 and drawn to an enlarged scale; and Figure 4 is a transverse section on line 4—4 of Figure 3.

As shown the device comprises a pair of plates 10, for attachment to the frame of the tractor, one only appearing in the drawings, each plate carrying a rack 11, coacting with pinion sectors 13, rigidly mounted upon a shaft 14 to which shaft is attached a draft link 15. The remaining end 17 of the draft link 15 is shown as pivotally secured at 18 to the end 19 of the beam of the implement to be operated by the tractor. For purpose of illustration this implement is indicated as a plow bottom 20.

It will be seen that when the plow is operated below the surface of the ground, the application of the draft to the end 19, of the beam will be below a straight line drawn between the point 14 at which the link 15 is connected to the drawing force and the center of pull of the plow bottom. This being the case there will be a tendency for the end of the beam 19 to lift, which action, as is well known to all who have handled a plow, results in either bringing the plow out of the ground or in causing the plow to produce a more shallow furrow.

To prevent such lifting there is shown a spring 22 acting in compression between a collar 23 secured to the rod 24 and a bracket 25 carried by a plate 26. The resistance to compression of the spring 22 is such as to yieldingly resist the forces tending to lift the forward ends of the beam as a result of the normal tendency of the link 15, to rise, due to the forward end of the link being higher as explained in my copending application above referred to.

To control the height of the plow and of the draft connections there is shown a hand lever 27 controlled by a detent 28 coacting with a sector 29 in the usual manner.

The lever 27 is shown as rigidly secured to square shaft 30 to which are also secured arms 31, 32 and 33.

The arm 31 is shown as connected by link 34 with the arm 35 rigid with shaft 14. The arm 33 is shown as connected by eye 36 with rod 24 and the arm 32 by rod 37 with an arm 38 secured to link 39, connected at its end to the plow beam 19. It will be seen that movement of the hand lever 27 upwardly or to the right in Figure 2 will depress the plow bottom 20 to working position, will allow the front end of beam 19 to lower and to be forcibly depressed by contact of the eye 36 with the bracket 25, putting compression upon spring 22, and will also cause the pinions 13 to travel downwardly in the rack 11, the shaft 14 moving in slots 41 in plates 10. The opposite movement will lift the plow bottom out of the earth to the position shown in Figure 2.

The result of the combination of the rack and pinions 11—13 with the depressing spring 22 and with the link 15 is that the angle between the link 15 and the line of draft is preserved during various regulations of the depth of operation of the implement in use, thereby completing the application of the principle of an automatic regulation of depth of the furrow to its logical conclusion.

Minor changes may be made in the physical embodiment of the invention within the scope of the appended claims without departing from the spirit of the invention.

I claim:

1. A draft gear comprising, in combination: an implement having a beam; a draft frame; a link pivotally connected at its rear end to the front end of said beam and at its front end to a movable member; means connecting said member to said frame; the axis of said first named pivotal connection lying below a line drawn from said movable member to the center of draft of the implement; resilient means to balance the upward component of force resulting from said connection; and means to adjust the height of said resilient means and said movable member simultaneously.

2. A draft gear comprising, in combination: an implement of the plow type having a beam; a link pivotally connected at its rear end with the end of the beam and at its forward end to a draft frame at a point above the point of intersection with the frame of a line through the center of draft of the implement and the beam connection; resilient means to resist the tendency toward upward movement of the beam end; means to adjust the depth of furrow cut by the implement including means to adjust the height of said forward pivotal connection.

3. A draft gear comprising, in combination: a draft frame; an implement of the plow type having a beam; a link connecting the forward end of the beam with the frame, extending at an angle to produce a tendency to lift the beam; a spring acting in compression to resist the lifting thrust so caused; connection to the implement adjacent the digging element thereof to exert lifting force thereon; means to cause vertical movement of the frame connected end of the link; a control lever, and means simultaneously operated by said lever to vertically move said link to frame connection, said spring, and said last named connection.

4. A draft gear comprising in combination, an implement having a suction member and a forwardly extending member, a draft member having its rear end connected to the forwardly extending member and at its forward end having connections for attaching to a vehicle frame, resilient means for holding the connection between the draft member and forwardly extending member below a straight line from the vehicle connection to the center of load of the implement and hand controlled means for varying the height of the vehicle connection.

5. A draft gear comprising in combination, an implement having a suction member and a forwardly extending member, a draft member having its rear end connected to the forwardly extending member and at its forward end having connections for attaching to a vehicle frame, resilient means for holding the connection between the draft member and forwardly extending member below a straight line from the vehicle connection to the center of load of the implement and hand controlled means for varying, simultaneously, the heights of the ends of the draft member.

6. A draft gear comprising in combination, an implement of the suction type having a beam, draft means having its rear end pivotally connected to the forward portion of the beam, vehicle attachment means, including a pivot at the forward end of the draft means and provided with height varying mechanism for predeterminedly adjusting the forward end of the draft means, means including a resilient device actuating in response to the draft of the implement to automatically adjust the forward end of the beam vertically to maintain a substantially constant draft and to keep the beam connection below a straight line from the vehicle attachment pivot to the center of load of the implement and means to adjust the forward draft means pivot and the resilient device.

7. A draft gear comprising in combination, an implement of the suction type having a beam, draft means having its rear end pivotally connected to the forward portion of the beam, vehicle attachment means including a pivot at the forward end of the draft means and provided with height varying mechanism for predetermining adjusting the forward end of the draft means, means including a resilient device actuating in response to the draft of the implement to automatically adjust the forward end of the beam vertically to maintain a substantially constant draft and to keep the forward beam connection below a straight line drawn from the vehicle attachment pivot to the center of load of the implement, the resilient means having vehicle connecting means independent of the vehicle attachment means and lever means to adjust the forward draft means pivot and the resilient device simultaneously.

CHARLES T. RAY.